US009212005B1

(12) United States Patent
Koenig et al.

(10) Patent No.: US 9,212,005 B1
(45) Date of Patent: Dec. 15, 2015

(54) CANTILEVERED SCREW ASSEMBLY

(71) Applicants: Mark E. Koenig, Pickerington, OH (US); Larry E. Koenig, Canal Winchester, OH (US)

(72) Inventors: Mark E. Koenig, Pickerington, OH (US); Larry E. Koenig, Canal Winchester, OH (US)

( * ) Notice: Subject to any disclaimer, the term of this patent is extended or adjusted under 35 U.S.C. 154(b) by 0 days.

(21) Appl. No.: 14/818,751

(22) Filed: Aug. 5, 2015

Related U.S. Application Data

(63) Continuation of application No. 13/667,313, filed on Nov. 2, 2012, now Pat. No. 9,132,968.

(60) Provisional application No. 61/555,863, filed on Nov. 4, 2011.

(51) Int. Cl.
| | | |
|---|---|---|
| *B65G 33/14* | (2006.01) | |
| *B65G 33/34* | (2006.01) | |
| *B65G 33/32* | (2006.01) | |
| *B65G 45/02* | (2006.01) | |

(52) U.S. Cl.
CPC ............... *B65G 33/32* (2013.01); *B65G 45/02* (2013.01)

(58) Field of Classification Search
CPC .................................................. B65G 33/265
USPC ......... 198/657, 658, 662, 673, 674, 677, 950; 222/412
See application file for complete search history.

(56) References Cited

U.S. PATENT DOCUMENTS

| | | | | | |
|---|---|---|---|---|---|
| 728,516 | A | * | 5/1903 | Trabue | A01F 15/0825 100/191 |
| 829,315 | A | * | 8/1906 | Anderson | B30B 9/267 100/129 |
| 1,221,054 | A | * | 4/1917 | Hyatt | B30B 9/12 100/148 |
| 1,506,036 | A | * | 8/1924 | Willmarth | B30B 11/24 100/904 |
| 2,470,278 | A | * | 5/1949 | West | A01F 15/0825 100/191 |
| 2,576,784 | A | * | 11/1951 | Dodds | A01F 5/0825 100/191 |
| 2,615,387 | A | * | 10/1952 | Messing | B30B 9/12 100/125 |
| 2,823,603 | A | * | 2/1958 | Collins | A01F 5/0825 100/179 |
| 2,902,922 | A | * | 9/1959 | Williams | A01F 5/0825 100/192 |
| 2,982,201 | A | * | 5/1961 | Kruger | A01F 15/0825 100/188 R |
| 3,179,040 | A | * | 4/1965 | Seltzer | B30B 9/3025 100/192 |

(Continued)

OTHER PUBLICATIONS

FKC Co., Ltd., Biosolids Dewatering, sales literature, 2 pages, found at www.fkcscrewpress.com, copyrighted 2009.

(Continued)

*Primary Examiner* — Douglas Hess
(74) *Attorney, Agent, or Firm* — Standley Law Group LLP

(57) ABSTRACT

An exemplary embodiment is directed to a cantilevered screw assembly comprising a solid oil bearing to facilitate rotation of the screw. Another exemplary embodiment of a cantilevered screw assembly includes an improved anchor system comprising multiple load-bearing walls. In particular, an exemplary embodiment may comprise a screw that is cantilevered to at least two walls. At least one reinforcement member may connect the walls for additional support.

36 Claims, 6 Drawing Sheets

(56) References Cited

U.S. PATENT DOCUMENTS

| | | | | |
|---|---|---|---|---|
| 3,588,356 A * | 6/1971 | Poux et al. | ............... | G10L 25/78 704/236 |
| 3,787,830 A * | 1/1974 | Cato et al. | ............... | G08B 21/18 100/229 A |
| 3,866,529 A * | 2/1975 | Holman | ................ | B30B 9/3025 100/192 |
| 3,877,365 A * | 4/1975 | Berggren | ................ | B30B 9/124 100/117 |
| 3,938,434 A * | 2/1976 | Cox | ......................... | B30B 9/121 100/112 |
| 3,982,483 A * | 9/1976 | Bird | ......................... | B30B 9/121 100/117 |
| 4,037,528 A * | 7/1977 | White | ................... | B30B 9/3025 100/191 |
| 4,256,035 A * | 3/1981 | Neufeldt | ................. | A01F 15/00 100/145 |
| 4,289,067 A * | 9/1981 | Hanak | ....................... | B30B 9/12 100/117 |
| 4,323,007 A * | 4/1982 | Hunt | ....................... | B30B 9/12 100/117 |
| 4,355,905 A * | 10/1982 | St. Louis | ................. | B29C 47/84 277/354 |
| 4,516,492 A * | 5/1985 | Olfert | ................... | B30B 9/3025 100/192 |
| 4,567,820 A * | 2/1986 | Munsell | ................... | A01F 25/14 100/145 |
| 4,636,127 A * | 1/1987 | Olano | .................... | C21B 13/105 34/183 |
| 4,709,628 A * | 12/1987 | Glowacki | ................ | B30B 9/18 100/117 |
| 4,770,236 A * | 9/1988 | Kulikowski | ............. | F26B 17/20 165/86 |
| 4,784,563 A * | 11/1988 | Esh | .......................... | B65G 5/46 239/675 |
| 4,807,816 A * | 2/1989 | Ataka | ..................... | B02C 19/22 241/260.1 |
| 4,852,817 A * | 8/1989 | Tipton | ................. | B02C 19/0081 100/127 |
| 4,897,194 A * | 1/1990 | Olson | .................. | B01D 29/356 100/129 |
| 4,951,884 A * | 8/1990 | Koenig | ................... | B02C 19/22 198/672 |
| 5,040,736 A | 8/1991 | Obitz | | |
| 5,108,040 A * | 4/1992 | Koenig | ................. | B30B 11/246 241/260.1 |
| 5,114,331 A * | 5/1992 | Umehara | ................... | B29B 9/06 264/916 |
| 5,148,994 A | 9/1992 | Haider et al. | | |
| 5,148,998 A | 9/1992 | Obitz | | |
| 5,180,225 A * | 1/1993 | Piccolo, Sr. | ........... | B01F 15/068 165/87 |
| 5,308,003 A * | 5/1994 | Koenig | ................... | B02C 19/22 241/260.1 |
| 5,373,923 A * | 12/1994 | Koenig | ................... | B02C 19/22 188/303 |
| 5,383,397 A * | 1/1995 | Battles | .................... | B30B 1/003 100/125 |
| 5,601,239 A * | 2/1997 | Smith | ...................... | B02C 19/22 241/260.1 |
| 5,611,268 A * | 3/1997 | Hamilton | ............. | B30B 9/3089 100/147 |
| 5,662,035 A * | 9/1997 | Lee | ......................... | B01D 29/25 100/112 |
| 5,695,136 A | 12/1997 | Rohden et al. | | |
| 5,735,199 A * | 4/1998 | Esau | ................... | A01F 15/0825 100/191 |
| 5,819,643 A * | 10/1998 | McIlwain | ............ | A01F 15/0825 100/192 |
| RE36,023 E * | 1/1999 | Koenig | ................. | B30B 11/246 100/145 |
| 5,998,640 A * | 12/1999 | Haefele | ............... | B01D 11/0242 196/14.52 |
| 6,186,060 B1 * | 2/2001 | Peterson | ................. | A01F 15/00 100/138 |
| 6,247,662 B1 * | 6/2001 | Hamilton | ............. | B30B 9/3025 241/260.1 |
| 6,276,622 B1 | 8/2001 | Obitz | | |
| 6,505,550 B2 * | 1/2003 | Hamilton | ............. | B30B 9/3025 100/148 |
| 6,793,165 B2 | 9/2004 | Obitz | | |
| 6,945,487 B1 * | 9/2005 | Obitz | ....................... | D21D 1/20 241/260.1 |
| 6,948,329 B2 * | 9/2005 | Nomura | .................. | F25C 1/147 62/354 |
| 7,226,213 B2 * | 6/2007 | Roos | ....................... | F16C 33/04 384/298 |
| 7,229,526 B2 | 6/2007 | Obitz | | |
| 7,234,915 B2 | 6/2007 | Obitz | | |
| 7,360,639 B2 * | 4/2008 | Sprouse | ..................... | C01B 3/56 198/658 |
| 7,523,996 B1 * | 4/2009 | Darst | ...................... | E21C 25/58 299/67 |
| 7,631,596 B2 * | 12/2009 | Williams | ................ | B30B 9/125 100/117 |
| 7,740,325 B1 * | 6/2010 | Chen | ..................... | B60B 27/047 192/110 B |
| 7,828,482 B2 * | 11/2010 | Beausoleil | ................ | B22F 7/08 29/898.042 |
| 7,851,585 B2 * | 12/2010 | Brison | .................... | C08L 59/00 264/176.1 |
| 8,033,733 B2 * | 10/2011 | Lang | ....................... | F16C 17/02 384/276 |
| 2005/0054507 A1 * | 3/2005 | Cornay et al. | | |
| 2005/0069446 A1 * | 3/2005 | Kriehn | | |
| 2008/0121497 A1 * | 5/2008 | Esterson et al. | | |
| 2010/0266230 A1 * | 10/2010 | Hong | | |
| 2011/0011283 A1 * | 1/2011 | Burke | | |

OTHER PUBLICATIONS

RUNI Danish Engineering, SK240, sales literature, 1 page, found at www.runi.dk, copyrighted 2009.

RUNI Danish Engineering, Screw compactor, product information, 2 pages, found at www.compactor-runi.com, Apr. 19, 2011.

PolyMax, Polystyrene Foam Densifier, product information, 1 page, found at www.polyman5000.com, copyrighted 2006.

Intcorecycling.com, GreenMax Recycling Machine, product information, 1 page, found at www.intcorecycling.com, copyrighted 2009-2010.

Foam Equipment+Consulting Co., Heger Recycling Equipment, sales literature, 3 pages, found at www.foamequipment.com/heger.com, copyrighted 2009.

RecycleTech Corp., RecycleTech—The Environment Savers, company information, 1 page, found at www.recycletechno.com, copyrighted 2009.

Intcorecycling.com, GreenMax Recycling Machine, product information, 2 pages, found at www.intcorecycling.com, copyrighted 2009-2010.

Sebright Products, Inc., Bright Technologies—Innovators in Dewatering Equipment Technologies, product information, 2 pages, found at www.brightbeltpress.com, copyrighted 2006.

* cited by examiner ns screw assembly. Examples of can-
CANTILEVERED SCREW ASSEMBLY This application is a continuation of U.S. application Ser. No. 13/667,313, filed Nov. 2, 2012, which claims the benefit of U.S. Provisional Application No. 61/555,863, filed Nov. 4, 2011, each of which is hereby incorporated by reference in its entirety.

BACKGROUND AND SUMMARY OF THE INVENTION

Exemplary embodiments of the present invention relate generally to a cantilevered screw assembly. Examples of cantilevered screw assemblies may include, but are not limited to, augers, compactors, crushers, shredders, feeders, material handlers, bale breakers, briquetters, and autoclave sterilizers. Other applications of cantilevered screw assemblies are also possible.

There is a need to improve known cantilevered screw assemblies. Large scale cantilevered screw assemblies are in particular need of improvement due to the dynamics of such systems. Nevertheless, small scale cantilevered screw assemblies may have a similar need for improvement.

Known cantilevered screw assemblies have used grease-lubricated bearings. Such systems may provide a reservoir of grease that is supplied to the bearings. While effective, the reservoir of grease needs to be periodically refilled, which increases the necessary maintenance of the system. The associated downtime also limits the productivity of the system. In addition, replenishing the grease adds to the operational cost of the system. A further drawback is that the grease will eventually lead to oil drips or other oily messes. Thus, there are needs to improve the maintenance, operational costs, and environmental friendliness of cantilevered screw assemblies.

Additional needs exist to improve the stability, size, and load-bearing capacity of cantilevered screw assemblies. The screws of some known cantilevered screw assemblies have a tendency to shift in position or wobble during operation. The anchoring of known cantilevered screw assemblies may also limit load-bearing capacity. For instance, known assemblies may cantilever a screw to a load-bearing wall. The load-bearing wall may limit the size of the screw and the amount of material that can be processed. If the size of the screw is excessive, it may compromise the load-bearing wall. For example, it may lead to oil canning of the load-bearing wall. Oil canning may affect the operation of the screw as aforementioned, and it may eventually render the system inoperable.

Exemplary embodiments may satisfy one or more of the aforementioned needs. One exemplary embodiment of a cantilevered screw assembly may include at least one bearing that includes solid oil. For example, one embodiment of a cantilevered screw assembly may include at least one bearing that is filled with solid oil. Such embodiments of a cantilevered screw assembly may offer numerous advantages including substantially decreased maintenance, lower operational costs, higher system efficiency, and improved environmental characteristics. It is estimated that the bearings of some exemplary embodiments may last at least two times longer between maintenance intervals as compared to a comparable cantilevered screw assembly that uses grease-lubricated bearings, which may significantly lower operational costs and raise operational efficiency. Moreover, oil leaks and drips may be substantially eliminated, drastically reducing the environmental impact.

Another exemplary embodiment of a cantilevered screw assembly includes an improved anchor system comprising multiple load-bearing walls. In particular, an exemplary embodiment may comprise a screw that is cantilevered to at least two walls. Examples of the improved anchor system may allow for a larger screw without compromising stability or the integrity of the load-bearing walls. Also, exemplary embodiments may enable more material to be processed by the cantilevered screw assembly with greater power and torque.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to a cantilevered screw assembly. FIGS. 1-6 show various views of one embodiment of a cantilevered screw assembly 10 comprising a screw 12, which has a shaft 14. In this example, the shaft 14 has a slight taper. Other types of cantilevered screw assemblies may also benefit from aspects of the present invention. For instance, some embodiments may not have a shaft with a taper, while other embodiments may have a shaft with a reverse taper. For embodiments that have a shaft with a taper or reverse taper, the degree of the taper or reverse taper may be selected to fit the application of the cantilevered screw assembly.

Figure 1:
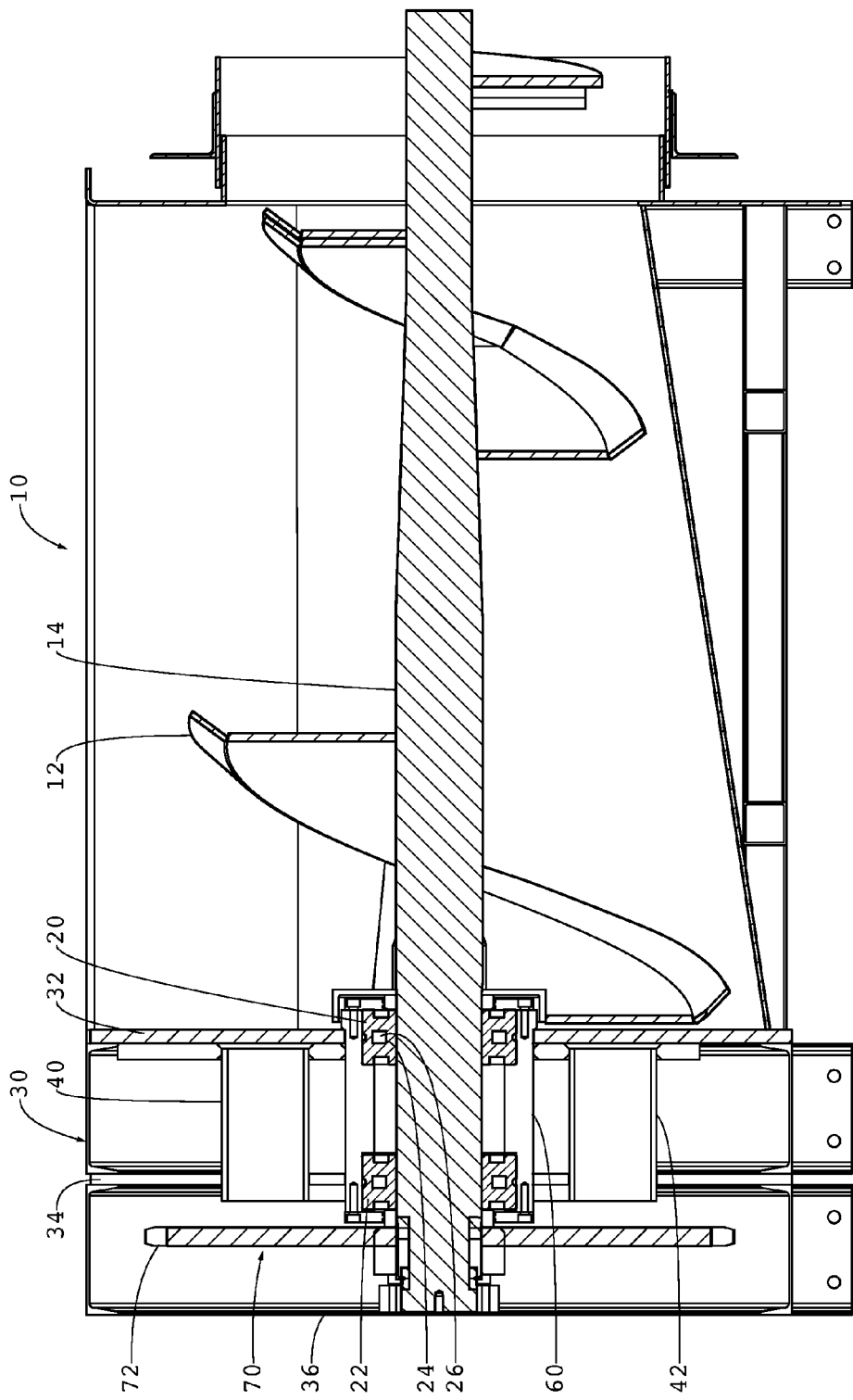
FIG. 1 is a cross-section view of an exemplary embodiment of a cantilevered screw assembly.

One aspect of an exemplary embodiment is the use of at least one solid oil bearing in association with shaft 14 to facilitate rotation. In the example of FIG. 1, a first solid oil bearing 20 and a second solid oil bearing 22 enable rotation of shaft 14. Other exemplary embodiments may include the use of more solid oil bearings.

An example of a solid oil bearing may have a cavity that is filled with solid oil. For example, solid oil bearing 20 has a cavity 24 that is filled with solid oil 26. Solid oil 26 may form adjacent or around the rolling elements of bearing 20, for example, to provide lubrication. Other bearing designs comprising solid oil are also possible.

An example of solid oil is comprised of oil in a polymer matrix or structure. In other examples, the supporting matrix or structure may be comprised of other types of plastic or other suitable material for retaining or reabsorbing the oil. In an exemplary embodiment, oil from the solid oil may provide lubrication substantially without dripping because the supporting material may have a porous structure that retains or reabsorbs the oil. The oil may coat contacting surfaces (e.g., the rolling elements), and the supporting structure is adapted to reabsorb any excess oil such that it is not expelled. Examples of solid oil are available from PhyMet, Inc. and SKF Group.

In another aspect, screw 12 is cantilevered to the walls of a multiple wall assembly 30. In this example, the multiple wall assembly 30 is comprised of at least a first wall 32 and a second wall 34 to which the screw 12 is cantilevered. This exemplary embodiment of multiple wall assembly 30 also includes a third wall 36 associated with shaft 14. Other embodiments may have more walls and/or may have a third wall that is not associated with the screw shaft. In an exemplary embodiment, the association of the screw with the multiple wall assembly may provide improved structural support for the cantilevered assembly as compared to a single wall cantilevered assembly. Such an embodiment may increase the stability of the screw and also allow for a larger and more powerful screw that has the capacity to process more material.

Each wall is comprised of metal in this exemplary embodiment. In other embodiments, other materials having suitable structural properties may be used.

In this exemplary embodiment, first wall 32 is connected to second wall 34 by at least one reinforcement member. In combination with a multiple wall assembly, the use of an exemplary embodiment of at least one reinforcement member may further improve the stability of the screw and walls and also allow for an even larger and more powerful screw that is adapted to process more material. This embodiment includes a first reinforcement member 40, a second reinforcement member 42, a third reinforcement member 44, a fourth reinforcement member 46, a fifth reinforcement member 48, and a sixth reinforcement member 50 that are positioned around shaft 14 and the associated bearing assembly. In this example, the peripheries of first wall 32 and second wall 34 are also connected for additional reinforcement. Other embodiments may have less or more reinforcement members connecting the walls to achieve the desired reinforcement. Furthermore, in other exemplary embodiments, at least one reinforcement member may have any suitable position to connect a first wall to a second wall.

First reinforcement member 40, second reinforcement member 42, third reinforcement member 44, fourth reinforcement member 46, fifth reinforcement member 48, and sixth reinforcement member 50 are metal pipes in this exemplary embodiment. Other suitable reinforcement members may be used including, but not limited to, metal bars and other hollow or solid metal members. In addition, other suitable materials besides metal may be used for certain applications.

Figure 5:
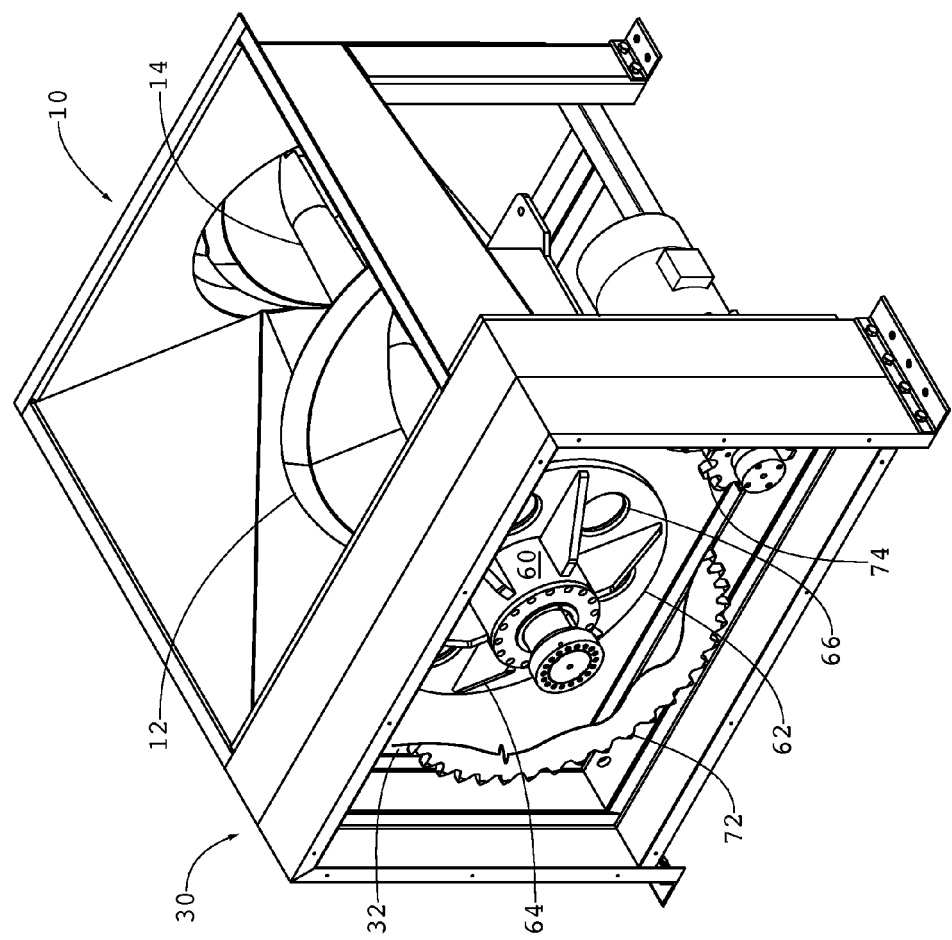
FIG. 5 is a perspective view of the cantilevered screw assembly of FIG. 1. In this view, portions have been removed or rendered transparent for clarity.
Figure 6:
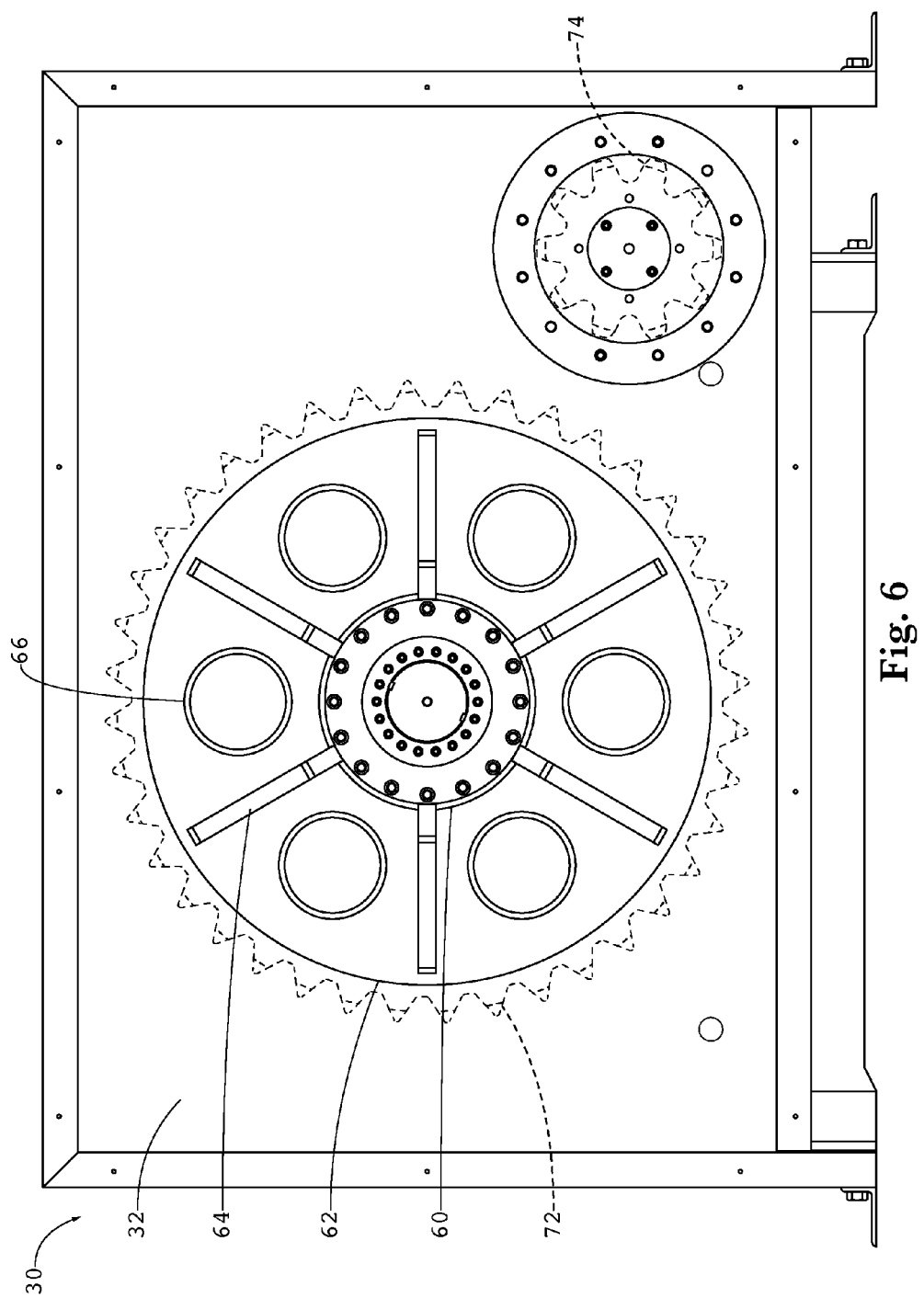
FIG. 6 is a side elevation view of the cantilevered screw assembly of FIG. 5, wherein portions have been removed or rendered transparent for clarity.

The bearing assembly may include a bearing housing adapted to house at least one bearing. In this embodiment, the bearing assembly includes a bearing housing 60 for housing bearing 20 and bearing 22. The bearing housing 60 extends between first wall 32 and second wall 34 in this example. Bearing housing 60 may serve as further reinforcement in this manner. Such as seen in FIGS. 5 and 6, an example of a bearing housing 60 may include at least one flared edge 62 and at least one flange 64 to assist with stabilization and/or securement to one or more walls (in this example, wall 32). In addition, an example of flared edge 62 may define at least one receptacle 66 to assist with securing a reinforcement member. At the same time, second wall 34 further supports bearing housing 60. Such an embodiment may increase the stability of screw 12 and the walls, and it may also allow for a larger and more powerful screw with the capacity to process more material.

With respect to the example in FIG. 1, solid oil bearing 20 is substantially aligned with first wall 32, and solid oil bearing 22 is substantially aligned with second wall 34. In other exemplary embodiments, a bearing housing may extend out further beyond the first wall (in a distal direction) and/or the second wall (in a proximal direction), such that a bearing is not aligned with a respective wall. An example of such an embodiment may increase the stability and strength characteristics of the screw. Also, in some exemplary embodiments, one or more bearings may be situated between the first wall and the second wall (i.e., not aligned with either wall).

As aforementioned, bearing housing 60 extends about solid oil bearing 20 and solid oil bearing 22 in this example. In other exemplary embodiments, a bearing housing may house fewer or more bearings. Furthermore, the bearings are not limited to solid oil bearings in this embodiment. For instance, although solid oil bearings may be preferred, this embodiment may include grease-lubricated bearings or other types of bearings.

Figure 2:
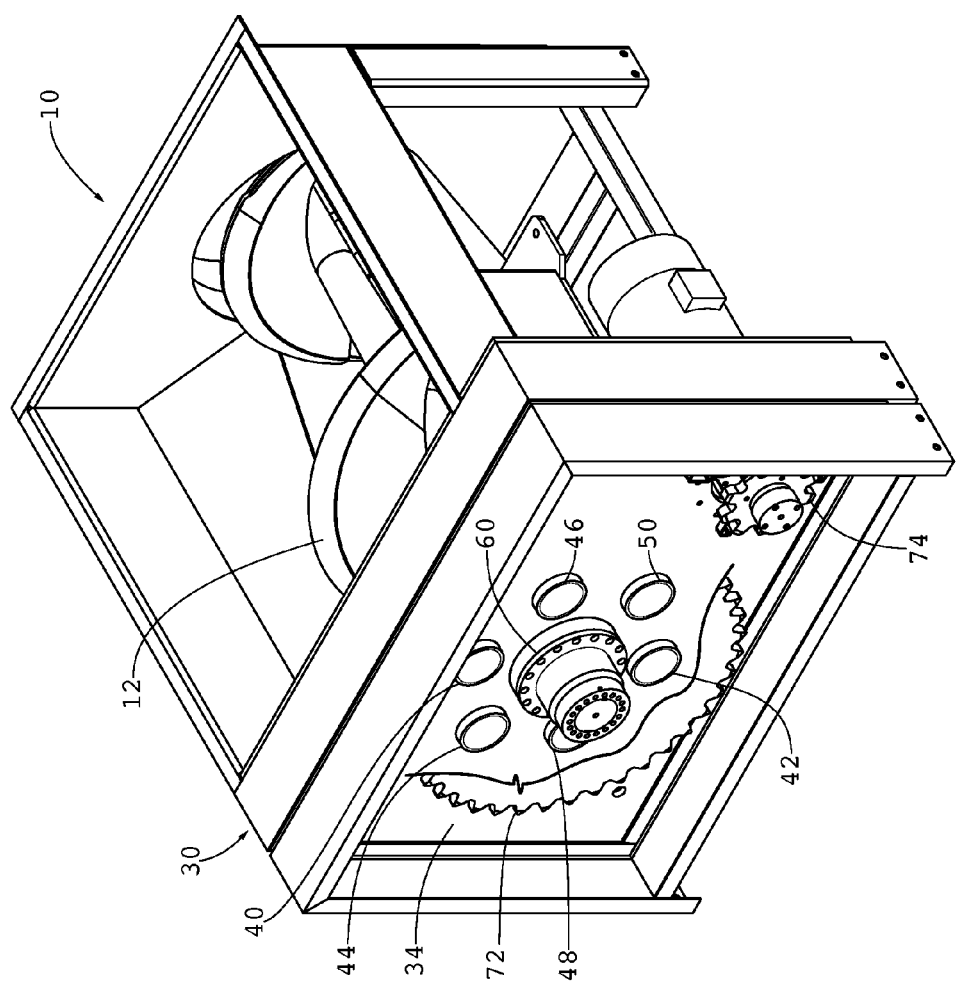
FIG. 2 is a perspective view of the cantilevered screw assembly of FIG. 1.
Figure 3:
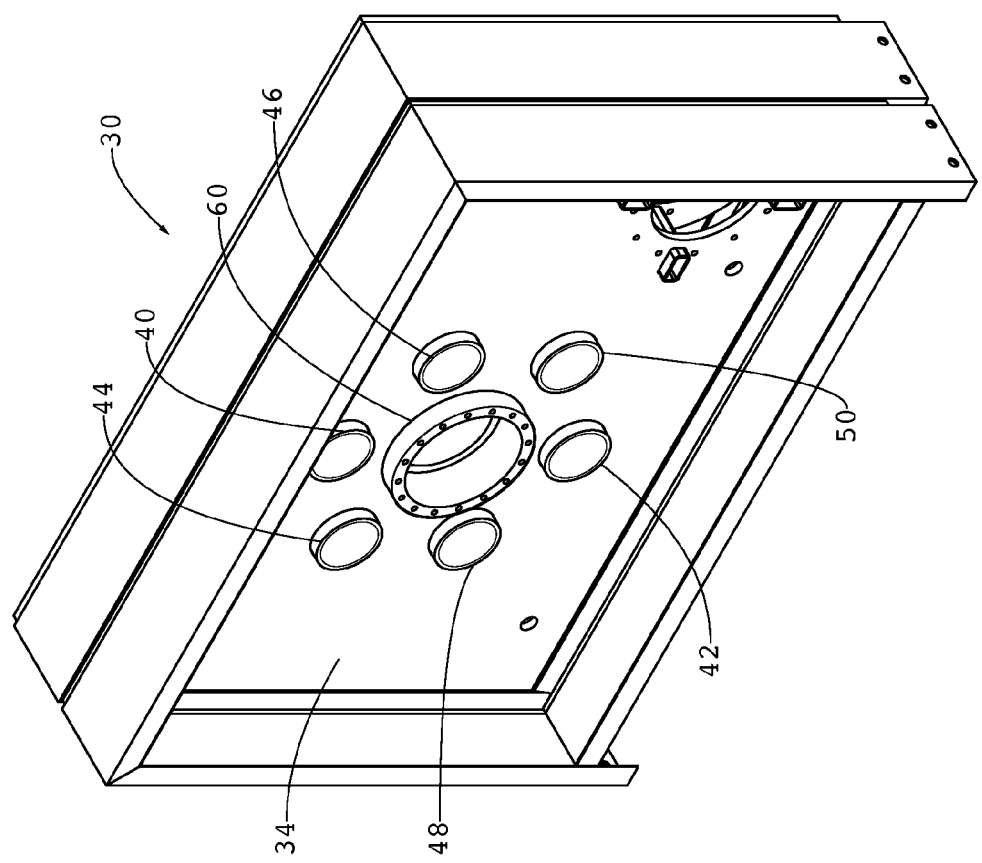
FIG. 3 is a perspective view of an exemplary embodiment of a load-bearing wall assembly of the cantilevered screw assembly of FIG. 1.
Figure 4:
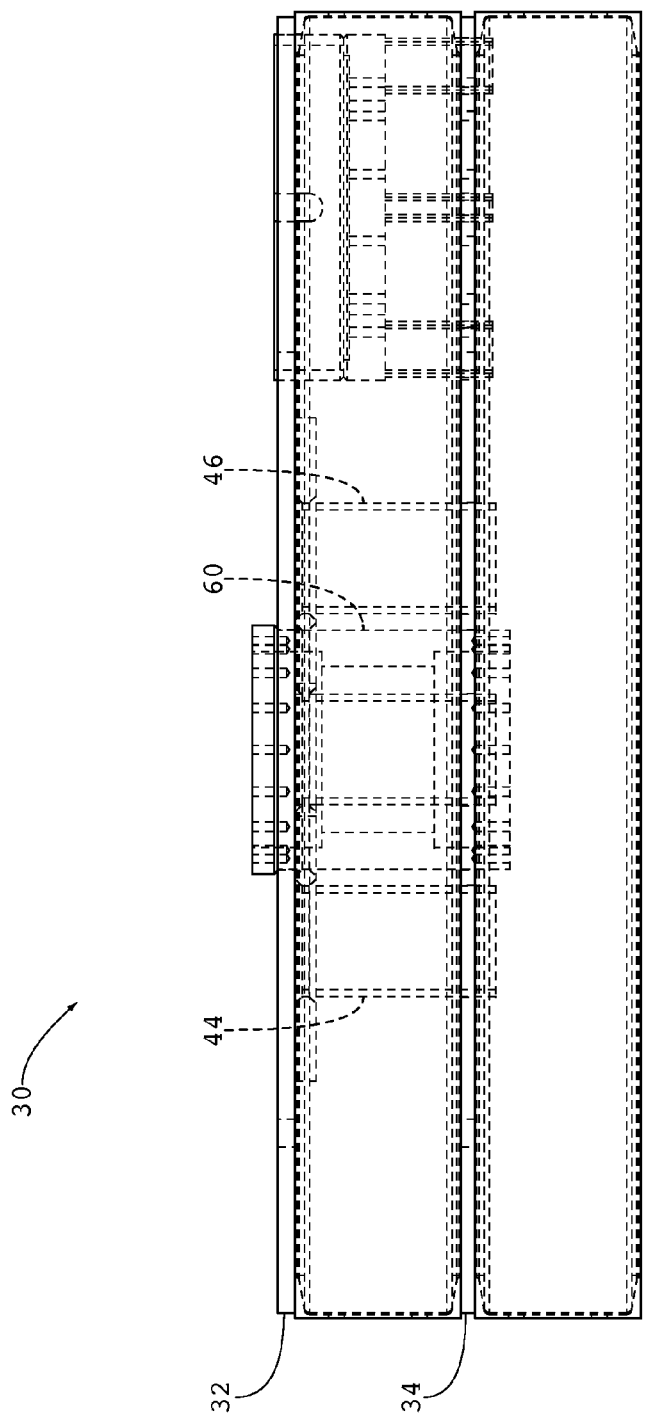
FIG. 4 is a top plan view of the load-bearing wall assembly of FIG. 3.

Referring to FIGS. 1 and 2, a drive chain assembly 70 may be situated outside of second wall 34 (i.e., on the proximal side of second wall 34). More particularly, drive chain assembly 70 is situated between second wall 34 and third wall 36 in this example. However, in some other exemplary embodiments, a drive chain assembly may be situated within a second wall or in another suitable position for facilitating rotation of the screw 12. In the example shown, drive chain assembly 70 is comprised of a first sprocket 72 and a second sprocket 74. In FIGS. 2, 5, and 6, sprocket 72 is shown as being transparent in order to show other exemplary features. Sprocket 74 is also transparent in FIG. 6 for clarity. Likewise, second wall 34 has been removed in FIGS. 5 and 6 for clarity. In other exemplary embodiments, other types of drive chain assemblies or other types of drive mechanisms may be used to facilitate rotation of the screw.

Due to the aforementioned benefits, the exemplary embodiments of a cantilevered screw assembly are particularly useful for processing waste materials. However, exemplary embodiments of a cantilevered screw assembly may also serve other purposes not limited to the processing of waste materials.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A screw assembly comprising:
   a screw housing;
   a screw situated in and cantilevered to said screw housing; and
   a bearing assembly secured to said screw housing and adapted to facilitate rotation of said screw relative to said screw housing, said bearing assembly comprising a bearing housing that houses at least one solid oil bearing comprising oil in a polymer structure that is adapted to retain or reabsorb said oil.

2. The screw assembly of claim 1 wherein each said solid oil bearing comprises a cavity filled with said oil.

3. The screw assembly of claim 1 wherein said screw comprises a shaft in association with said at least one solid oil bearing.

4. The screw assembly of claim 1 wherein said at least one solid oil bearing comprises a solid oil bearing that is aligned with a wall of said screw housing.

5. The screw assembly of claim 1 wherein said at least one solid oil bearing comprises a first solid oil bearing and a second solid oil bearing.

6. The screw assembly of claim 1 wherein said screw assembly is adapted to process waste material.

7. The screw assembly of claim 1 wherein said bearing housing has a stable connection to said screw housing.

8. The screw assembly of claim 1 wherein said screw is an auger.

9. The screw assembly of claim 1 wherein said bearing housing comprises at least one flared edge that facilitates securement to said screw housing.

10. The screw assembly of claim 1 wherein:
said screw housing comprises a first wall and a second wall, said second wall adjacent and spaced apart from said first wall; and
said screw is cantilevered to said first wall and said second wall.

11. The screw assembly of claim 10 wherein said at least one solid oil bearing comprises:
a first solid oil bearing substantially aligned with said first wall; and
a second solid oil bearing substantially aligned with said second wall.

12. The screw assembly of claim 11 wherein said bearing housing extends from said first wall to said second wall such that said bearing housing extends about said first solid oil bearing and said second solid oil bearing.

13. The screw assembly of claim 10 wherein said screw assembly is adapted to process waste material.

14. The screw assembly of claim 10 wherein said bearing housing has a stable connection to said first wall and said second wall of said screw housing.

15. The screw assembly of claim 10 wherein said screw is an auger.

16. The screw assembly of claim 10 wherein said bearing housing comprises at least one flared edge that facilitates securement to at least one of said first wall and said second wall.

17. The screw assembly of claim 10 further comprising a plurality of reinforcement members connecting said first wall to said second wall.

18. A screw assembly comprising:
a multiple wall assembly comprising a plurality of walls that are adjacent to each other and spaced apart;
a screw cantilevered to said walls of said multiple wall assembly; and
a bearing assembly secured to said multiple wall assembly and adapted to facilitate rotation of said screw relative to said multiple wall assembly, said bearing assembly comprising a bearing housing that houses at least one solid oil bearing comprising oil in a polymer structure that is adapted to retain or reabsorb said oil.

19. The screw assembly of claim 18 wherein said multiple wall assembly is comprised of a first wall and a second wall such that said screw is cantilevered to said first wall and said second wall.

20. The screw assembly of claim 19 wherein said first wall and said second wall are comprised of metal.

21. The screw assembly of claim 19 wherein said multiple wall assembly further comprises a third wall.

22. The screw assembly of claim 21 wherein:
said screw comprises a shaft; and
said third wall is associated with said shaft.

23. The screw assembly of claim 21 further comprising a drive chain assembly situated between said second wall and said third wall such that said drive chain assembly is adapted to facilitate rotation of said screw.

24. The screw assembly of claim 18 wherein said screw assembly is adapted to process waste material.

25. The screw assembly of claim 18 wherein said bearing housing has a stable connection to said walls of said multiple wall assembly.

26. The screw assembly of claim 18 wherein said screw is an auger.

27. The screw assembly of claim 18 wherein said bearing housing comprises at least one flared edge that facilitates securement to at least one of said walls of said multiple wall assembly.

28. A screw assembly comprising:
a multiple wall assembly comprising a plurality of walls that are adjacent to each other and spaced apart;
at least one reinforcement member connecting said walls;
a screw cantilevered to said walls of said multiple wall assembly; and
a bearing assembly secured to said multiple wall assembly and adapted to facilitate rotation of said screw relative to said multiple wall assembly, said bearing assembly comprising a bearing housing that houses at least one solid oil bearing comprising oil in a polymer structure that is adapted to retain or reabsorb said oil.

29. The screw assembly of claim 28 wherein said at least one reinforcement member comprises a metal pipe.

30. The screw assembly of claim 28 wherein:
a plurality of said reinforcement members connect said walls; and
said reinforcement members are positioned around a shaft of the screw.

31. The screw assembly of claim 30 wherein said bearing housing connects said walls such that there is a stable connection to said walls.

32. The screw assembly of claim 28 wherein:
said multiple wall assembly comprises a first wall, a second wall, and a third wall;
said at least one reinforcement member connects said first wall to said second wall;
said bearing housing extends from said first wall to said second wall such that there is a stable connection to said first wall and said second wall; and
a drive chain assembly is situated between said second wall and said third wall such that said drive chain assembly is adapted to facilitate rotation of said screw.

33. The screw assembly of claim 28 wherein said screw assembly is adapted to process waste material.

34. The screw assembly of claim 28 wherein said bearing housing has a stable connection to said walls of said multiple wall assembly.

35. The screw assembly of claim 28 wherein said screw is an auger.

36. The screw assembly of claim 28 wherein said bearing housing comprises at least one flared edge that facilitates securement to at least one of said walls of said multiple wall assembly.

* * * * *